United States Statutory Invention Registration [19]

[11] Reg. Number: H854

Madderra [43] Published: Dec. 4, 1990

[54] ROCKET STABILIZING APPARATUS

[75] Inventor: Jimmy M. Madderra, Huntsville, Ala.

[73] Assignee: The United States of America as represented by the Secretary of the Army, Washington, D.C.

[21] Appl. No.: 285,152

[22] Filed: Dec. 9, 1988

[51] Int. Cl.[5] ..... F42B 13/32

[52] U.S. Cl. ..... 244/3.28; 244/3.3

*Primary Examiner*—Deborah L. Kyle
*Assistant Examiner*—Michael J. Carone
*Attorney, Agent, or Firm*—Freddie M. Bush; Robert L. Broad, Jr.; James T. Deaton

[57] ABSTRACT

Apparatus for stabilizing the flight of a rocket wherein the body of the rocket is provided with a plurality of petals arranged around the periphery of the aft end of the rocket with the leading end of each petal being pivotally attached to the rocket body such that the trailing end of each petal is free to move outward away from the rocket body. A ring slidably mounted on the rocket is linked to each of the petals in such a manner that as the ring moves in an aft direction on the rocket body the trailing ends of all of the petals simultaneously move outward equal distances from the rocket body.

5 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

ROCKET STABILIZING APPARATUS

DEDICATORY CLAUSE

The invention described herein may be manufactured, used and licensed by or for the Government for governmental purposes without the payment to me or of any royalties thereon.

BACKGROUND OF THE INVENTION

1. Field of the Invention

This invention relates to apparatus for stabilizing rockets in flight.

2. Prior Art

It is known that the flight of a rocket can be stabilized by providing the rocket with a plurality of petals each of which forms a portion of a cylinder such that when the petals are arranged around the aft end of the rocket the outer surfaces of the petals form a cylinder concentric with the axis of the rocket. The petals are pivotally attached to the rocket body at the forward ends thereof such that the trailing ends of the petals are free to move radially outward into the air stream to stabilize the flight of the rocket. One of the problems with such an arrangement is that the trailing ends of the petals do not always move outward the same distance or at the same time, such that the stabilizing effect of the petals is not the same around the periphery of the rocket.

SUMMARY OF THE INVENTION

Apparatus for stabilizing the flight of a rocket in flight wherein the body of the rocket is provided with a plurality of petals arranged around the periphery of the aft end of the rocket with the leading end of each petal being pivotally attached to the rocket body such that the trailing end of each petal is free to move outward away from the rocket body. A ring slidably mounted on the rocket is linked to each of the petals in such a manner that as the ring moves on the rocket body in an aft direction all of the trailing ends of the petals simultaneously move outward equal distances from the rocket body.

DETAILED DESCRIPTION OF THE INVENTION

Figure 1:
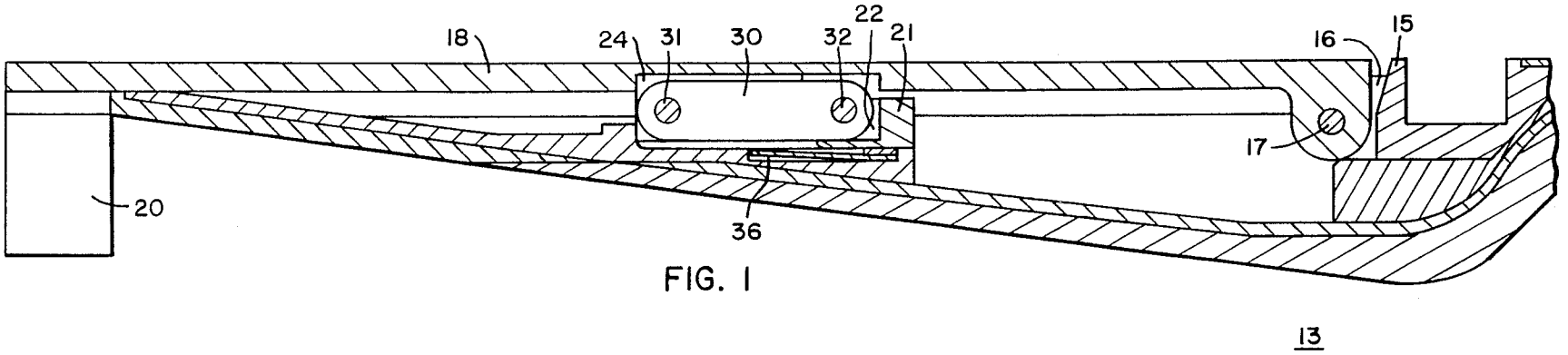
FIG. 1 is a fragmentary cross-sectional view showing one of the petals in a closed position.

Referring now is detail to the drawings, there is shown a rocket 11 having a generally cylindrical body 12 with fore and aft ends. The rocket is provided with a conventional throat 13 (FIGS. 1 and 2) from which propellant combustion products are expelled to propel the rocket at a high velocity.

A first ring 15 rigidly attached to the rocket body 12 is provided with a plurality of pairs of spaced ears 16 (FIG. 2) to which a plurality of petals 18 are pivotally attached by means of pins 17. The petals 18 are convex and are arranged around the periphery of the aft end of the rocket body 12 in such a manner that the outer surfaces of the petals 18 define a cylindrical surface having substantially the same diameter as the diameter of the rocket body 12.

The petals 18 extend from the ring 15 aft to the end of the rocket body 12 and are provided with vanes 20 which extend into the throat 13, the vanes 20 being positioned at an angle to the axis of the rocket body in order to have a twisting force applied to the vanes 20 by the propellant combustion products exiting the throat 13 at a high velocity. This is conventional structure.

Figure 2:
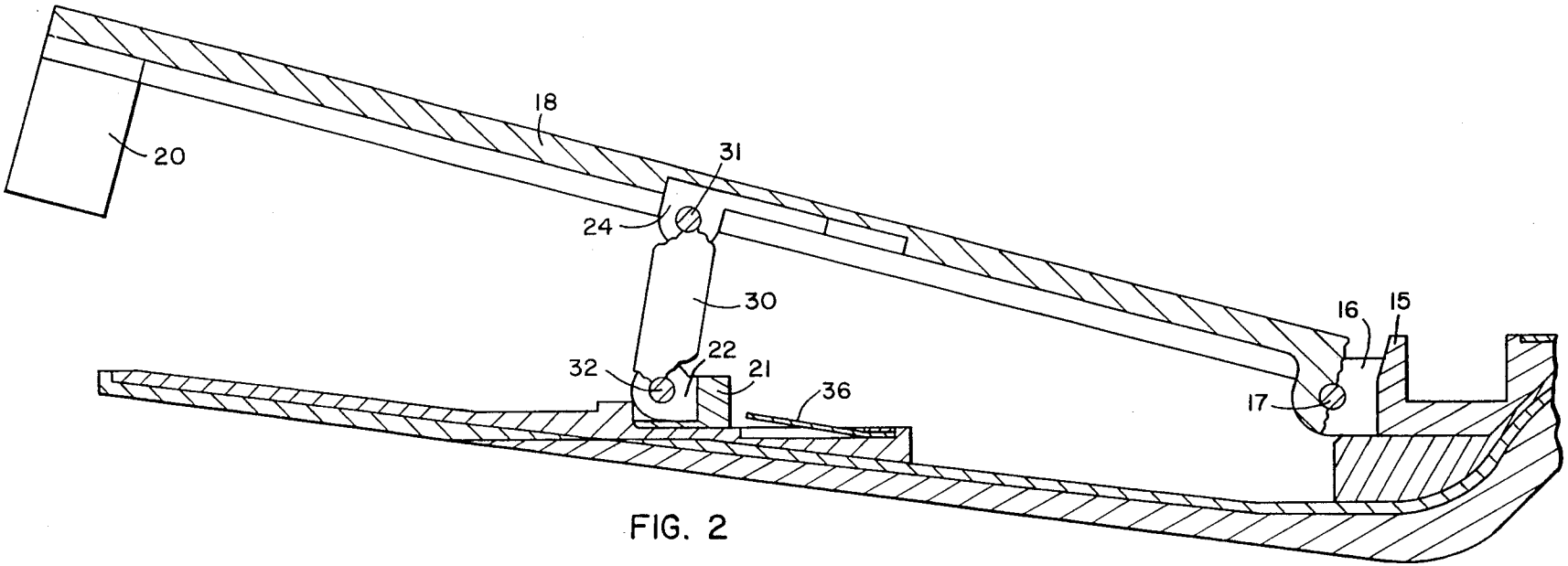
FIG. 2 is a fragmentary view of the apparatus of FIG. 1 showing the petal in an open position.
Figure 3:
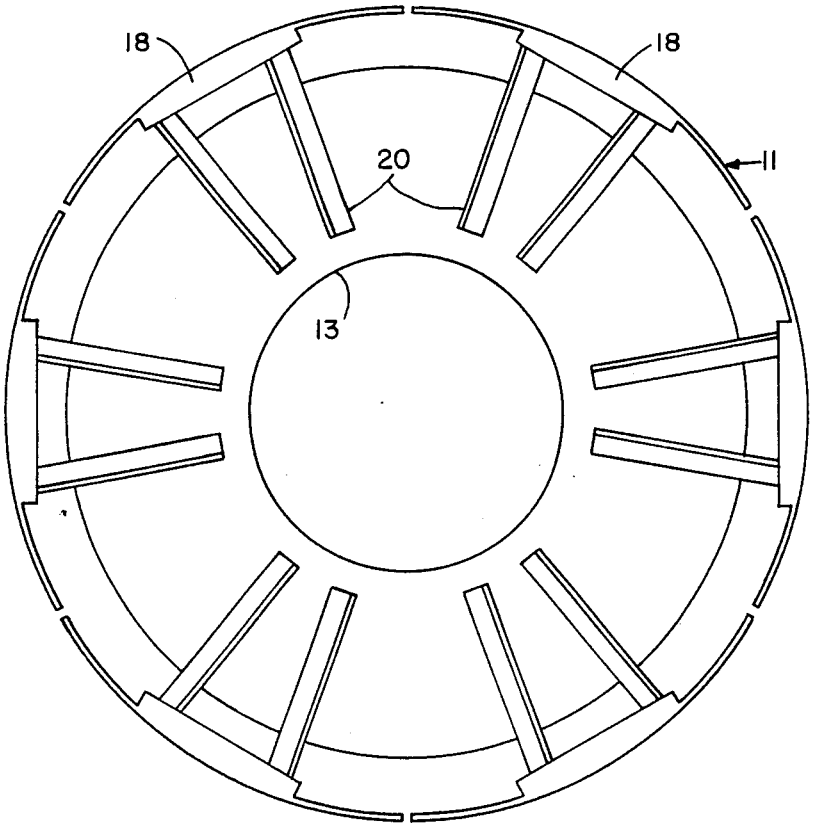
FIG. 3 is a view of the aft end of the rocket showing the vanes which are attached to the petals to impart a spin to the rocket as it passes through a launching tube.
Figure 4:
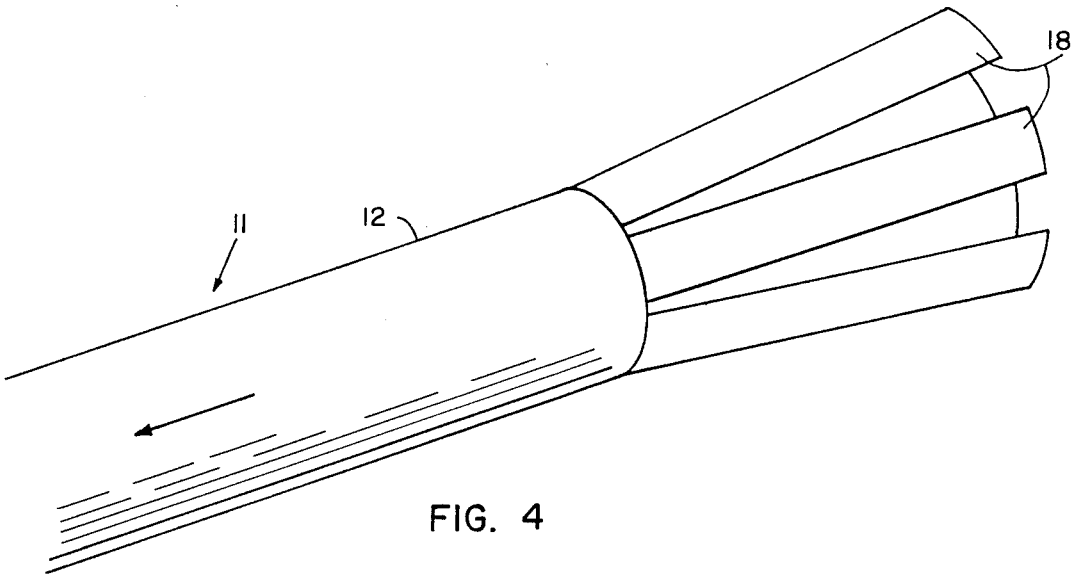
FIG. 4 is a fragmentary perspective view showing the aft end of the rocket with the petals in an open position.

A second ring 21 slidably mounted on the rocket body 12 is provided with a plurality of spaced pairs of lugs 22, with each pair of the lugs being longitudinally aligned with a pair of the ears 16 on the first ring 15 (FIG. 2). Each of the petals 18 is provided with a pair of spaced ears 24 aligned with a pair of lugs 22 on the second ring 21.

Each petal 18 is provided with a link 30 which pivots on a pin 31 extending through the ears 24 on the petal 18 at one end of the link 30. The other end of the link 30 is pinned by a pin 32 which extends through the link 30 and the lugs 22 on the ring 21. A leaf spring 36 secured at one end to the rocket body 12 is provided with a free end for engaging the ring 21 to prevent this ring from moving forward from an aft position after the petals have moved to an open position.

In operation, the rocket is positioned in a launching tube (not shown) with the petals 18 in the closed position shown in FIG. 1. The vanes 20 extending into the propellant combustion products exiting through the throat 13 cause the rocket to begin to spin as it passes through the launching tube. This spin, because of centrifugal force, causes the read ends of the petals 18 to move radially outward from the position shown in FIG. 1 to the position shown in FIG. 2 after the rocket clears the launching tube. Also, inertia of the ring 21 causes this ring to move aft on the accelerating rocket from the position shown in FIG. 1 to the position shown in FIG. 2 after the rocket is out of the launching tube.

Movement of the ring 21 is an aft direction on the rocket body causes the petals 18 to simultaneously move outward to the same distance to provide a uniform drag around the periphery of the aft end of the rocket body. It can readily be seen that the moveable ring 21 connects all of the petals 18 in such a manner that all of the petals move outward at the same rate and to the same distance.

What is claimed is:

1. Apparatus for stabilizing the flight of a rocket having fore and aft ends, comprising a. a plurality of petals arranged around the periphery of the aft end of the rocket and having leading and trailing ends, said petals having the leading ends thereof attached to the rocket in such a manner that said trailing ends are free to move radially outward from the rocket, b. a ring extending around the rocket, said ring being slidably mounted on the rocket, and c. a plurality of links, each of said links being pivotally connected at one end to the ring and at the other end to one of the petals such that when the ring is moved in an aft direction the trailing ends of the petals are moved radially outward.

2. The apparatus of claim 1 wherein the links are generally parallel to the axis of the rocket when the ring is in a forward position and are generally perpendicular to said axis when the ring is in an aft position.

3. The apparatus of claim 2 wherein a latch mounted on the rocket engages the ring when the ring is in an aft position to prevent the ring from moving forward from said aft position.

4. The apparatus of claim 3 wherein the latch is in the form of a leaf spring.

5. Apparatus for stabilizing the flight of a rocket having a cylindrical body and afore and aft ends, comprising a. a first ring secured to and extending around the rocket body, said first ring having a plurality of pairs of ears arranged around the periphery of said ring, b. a plurality of convex petals having leading and trailing ends, each of said leading ends being pivotally attached to a pair of said ears in such a manner that the trailing ends of the petals are free to move radially away from the rocket body, c. a second ring mounted on the rocket body aft of the first ring and having a plurality of pairs of spaced lugs, each pair of said lugs being longitudinally alligned with a pair of ears on the first ring, each of said petals having a spaced pair of ears aligned with a pair of ears on the first ring, d. a plurality of links, each of said links having one end thereof pivotally attached to a pair of lugs on the second ring and the other end pivotally attached to a pair of ears on one of the petals, said links being so arranged relative to the second ring and petal that aft movement of said second ring moves said trailing ends of said petals radially outward, and e. a leaf spring having one end attached to the rocket body and the other end free to engage the second ring to hold said second ring in an aft position after the trailing ends of the petals have moved radially outwardly.

* * * * *